US009194296B2

(12) United States Patent
Vrljes et al.

(10) Patent No.: US 9,194,296 B2
(45) Date of Patent: Nov. 24, 2015

(54) INNER BYPASS DUCT WALL ATTACHMENT

(75) Inventors: Ljubisa Vrljes, Etobicoke (CA);
Stephen Caulfeild, Rockwood (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 786 days.

(21) Appl. No.: 13/557,270

(22) Filed: Jul. 25, 2012

(65) Prior Publication Data

US 2013/0309070 A1 Nov. 21, 2013

Related U.S. Application Data

(60) Provisional application No. 61/648,703, filed on May 18, 2012.

(51) Int. Cl.
*F01D 25/26* (2006.01)
*F01D 25/28* (2006.01)
*F02C 7/20* (2006.01)

(52) U.S. Cl.
CPC ............. *F02C 7/20* (2013.01); *Y10T 29/49245* (2015.01)

(58) Field of Classification Search
CPC ....... F01D 25/243; F01D 25/26; F01D 25/28; F02C 7/20; B64D 2027/262; B64D 2027/264; B64D 2027/266; B64D 2027/268; Y10T 29/49245
USPC ........... 415/142, 144, 213.1, 214.1, 135, 136, 415/138, 139; 60/226.1, 226.2, 226.3, 797, 60/799, 800; 244/54; 248/554–557
See application file for complete search history.

(56) References Cited

U.S. PATENT DOCUMENTS

| | | | |
|---|---|---|---|
| 3,397,855 A | 8/1968 | Newland | |
| 4,228,651 A | 10/1980 | Mullins | |
| 4,326,682 A | 4/1982 | Nightingale | |
| 4,571,936 A * | 2/1986 | Nash et al. | 60/797 |
| 4,979,872 A * | 12/1990 | Myers et al. | 415/142 |
| 5,088,279 A | 2/1992 | MacGee | |
| 5,176,323 A | 1/1993 | Nash | |
| 5,524,847 A | 6/1996 | Brodell et al. | |
| 5,782,078 A * | 7/1998 | Brantley | 60/797 |
| 6,330,995 B1 | 12/2001 | Mangeiga et al. | |
| 6,547,518 B1 | 4/2003 | Czachor et al. | |
| 6,619,030 B1 | 9/2003 | Seda et al. | |
| 7,313,920 B2 | 1/2008 | Stretton et al. | |
| 7,523,616 B2 | 4/2009 | Zigan et al. | |
| 7,721,551 B2 | 5/2010 | Hanson | |
| 8,109,467 B2 | 2/2012 | Murphy | |
| 8,136,362 B2 | 3/2012 | Beutin et al. | |
| 9,068,476 B2 * | 6/2015 | Caulfeild et al. | 1/1 |
| 2005/0120718 A1 | 6/2005 | Markarian et al. | |
| 2008/0240845 A1 * | 10/2008 | Drelon et al. | 403/79 |
| 2009/0314881 A1 | 12/2009 | Suciu et al. | |
| 2010/0229527 A1 | 9/2010 | Amkraut et al. | |
| 2010/0287950 A1 | 11/2010 | Heyerman et al. | |
| 2010/0290903 A1 | 11/2010 | Heyerman et al. | |
| 2011/0127368 A1 | 6/2011 | Penda et al. | |
| 2012/0051903 A1 | 3/2012 | Heyerman et al. | |
| 2012/0216506 A1 | 8/2012 | Eleftheriou et al. | |

* cited by examiner

*Primary Examiner* — Christopher Verdier
(74) *Attorney, Agent, or Firm* — Norton Rose Fulbright Canada LLP

(57) ABSTRACT

A bypass duct of a gas turbine engine has an inner bypass duct wall having a front end portion which is rigidly mounted to an engine core case and a rear end portion which is flexibly mounted to the core case. The flexible mounting between the rear portion of the inner bypass duct wall and the core case allows hot engine areas of the core case to thermally grow and contract relative to the inner bypass duct wall without imposing additional loads on the inner bypass duct wall.

18 Claims, 7 Drawing Sheets

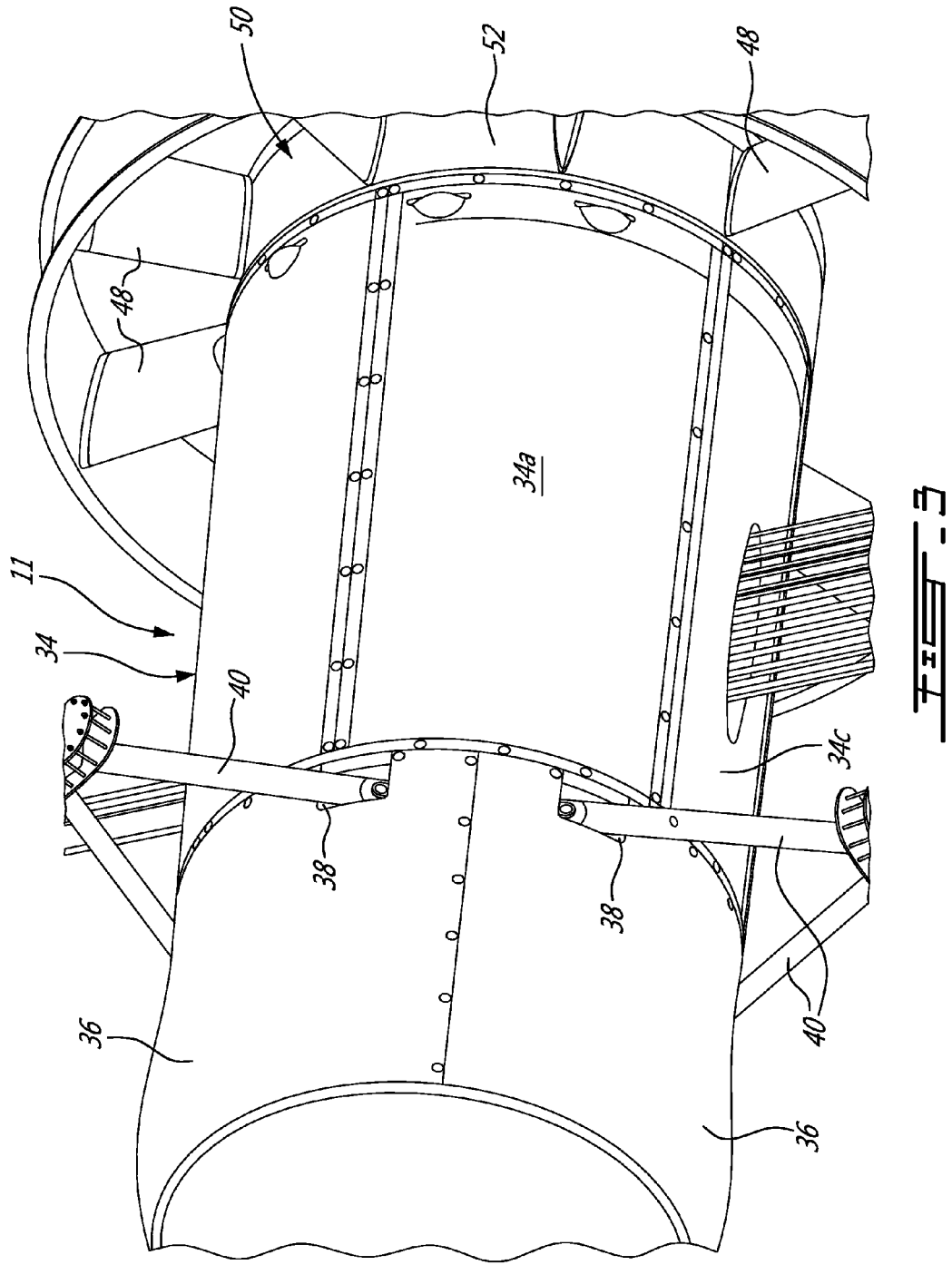

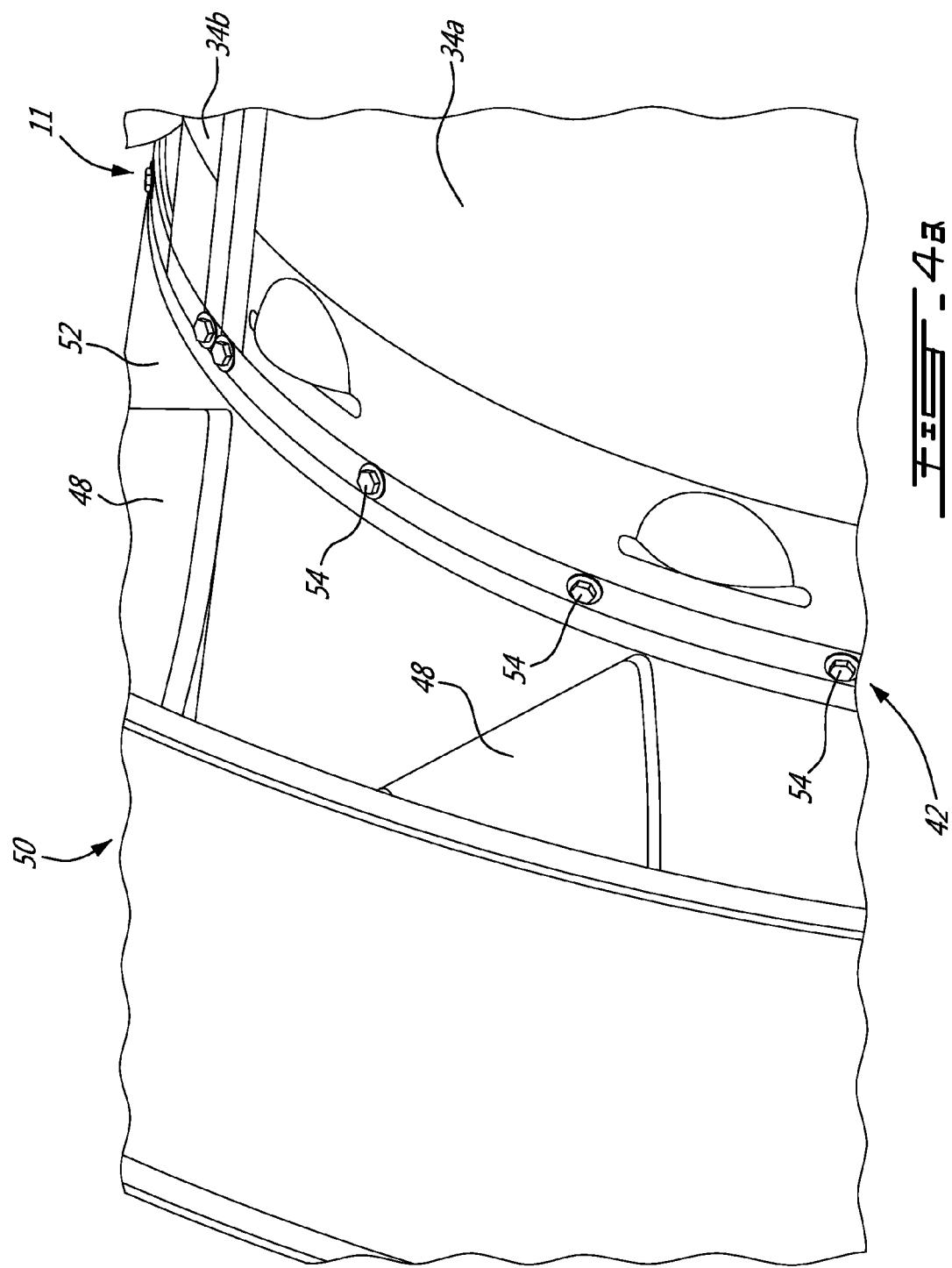

INNER BYPASS DUCT WALL ATTACHMENT

CROSS-REFERENCE TO RELATED APPLICATIONS

The present application claims priority on U.S. Provisional Application No. 61/648,703 filed on May 18, 2012, the entire content of which is incorporated herein by reference.

TECHNICAL FIELD

The application relates generally to gas turbine engines and, more particularly, to a mounting arrangement for an inner bypass duct wall.

BACKGROUND OF THE ART

Turbofan engines generally comprise an annular bypass duct defined between radially outer and radially inner bypass duct walls. The inner bypass duct wall is typically attached to the engine core cases by means of sheet metal brackets. The brackets are bolted to core case flanges at one end and to the inner bypass duct wall at the other end. A first set of brackets may be mounted to the high pressure compressor case, a second set to the high pressure turbine case and a third set to the turbine exhaust case. The front end of the inner bypass duct wall is typically connected to the intermediate case of the engine core via a sliding joint, known as a "fishmouth" ring connection. This type of joint is used to allow the inner bypass duct wall to move axially and radially due to thermal growth with the engine core cases and, thus, reduce the amount of stress transferred to the brackets. However, it has been observed that the core cases and the brackets are subject to cracking problems as a result of the radial and axial thermal fight between the inner bypass duct wall and the engine core cases at the bracket locations.

SUMMARY

In one aspect, there is provided a turbofan engine comprising: an engine core mounted about an axis, the engine core having a core case surrounded by a bypass duct including a radially outer bypass duct wall and a radially inner bypass duct wall defining therebetween an annular bypass passage, a rigid connection between a front end portion of the radially inner bypass duct wall and a corresponding front end portion of the core case, and a flexible connection between a rear end portion of the radially inner bypass duct and a corresponding rear end portion of the core case, the flexible connection allowing the rear end portion of the core case to thermally grow and contract relative to the radially inner bypass duct wall.

In another aspect, there is provided a bypass duct mounting arrangement for a gas turbine engine having an engine core with a core case, the mounting arrangement comprising: an outer bypass duct wall structurally connected to the core case, and an inner bypass duct wall disposed radially inwardly of the outer bypass duct wall, the inner and outer bypass duct walls defining therebetween an annular bypass passage about the engine core, the inner bypass duct wall having a front end portion which is rigidly mounted to the core case and a rear end portion which is flexibly mounted to the core case, the flexible mounting between the rear portion of the inner bypass duct wall and the core case allowing hot engine areas of the core case to thermally grow and contract relative to the inner bypass duct wall.

In accordance with a still further aspect, there is provided a method of attaching an inner bypass duct wall to a core case assembly of a gas turbine engine, the core case assembly comprising an intermediate case disposed forwardly of the inner bypass duct wall and a mid turbine frame (MTF) disposed axially between a high pressure and a low pressure turbine case section of the engine, the method comprising: rigidly attaching a front end portion of the inner bypass duct wall to the intermediate case, and flexibly attaching a rear portion of the inner bypass duct wall to the MTF.

DESCRIPTION OF THE DRAWINGS

Reference is now made to the accompanying figures in which:

FIG. 3 is a schematic bottom isometric view of the radially inner bypass duct wall mounted to the engine core case structure;

FIG. 4a is an enlarged isometric view of a front mounting assembly of the radially inner bypass duct wall;

DETAILED DESCRIPTION

Figure 1:
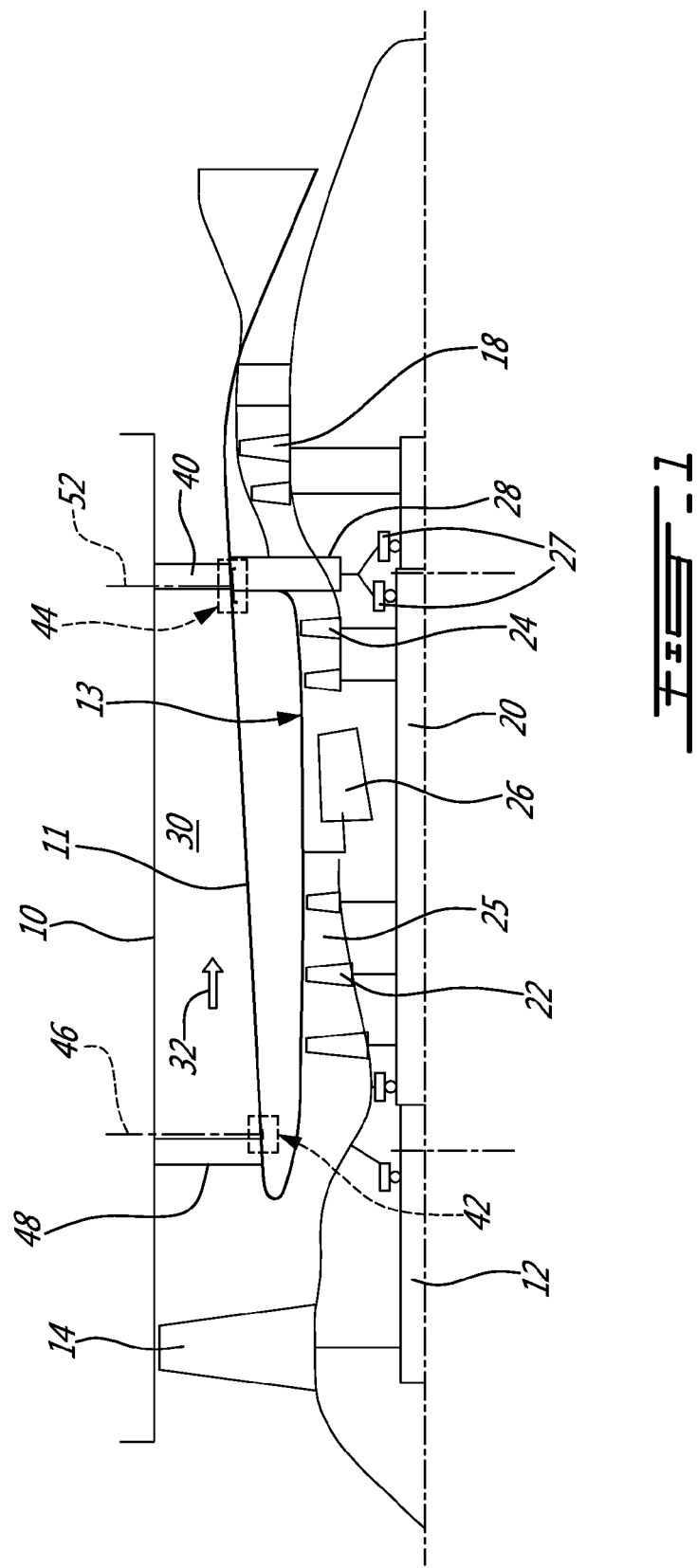
FIG. 1 is a schematic cross-sectional view of a turbofan gas turbine engine as an exemplary application of the described subject matter.

Referring to FIG. 1 a turbofan gas turbine engine (not numbered) generally comprises a low pressure spool assembly (not numbered) which includes a fan assembly 14, a low pressure compressor assembly (not numbered) and a low pressure turbine assembly 18 connected by a low pressure shaft 12, and a high pressure spool assembly (not numbered) which includes a high pressure compressor assembly 22 and a high pressure turbine assembly 24 connected by a high pressure shaft 20. The high pressure compressor 22 and the low and high pressure turbine assemblies 18, 24 form part of the engine core 13. The engine core 13 defines a main fluid path 25. A combustor 26 is provided in the main fluid path 25 to generate combustion gases to power the high and low pressure turbine assemblies 24, 18. The engine core 13 includes a mid turbine frame (MTF) 28 between the high and low pressure turbine assemblies 24 and 18. Bearings 27 are typically mounted to the MTF 28 for supporting the low and high pressure shafts 12 and 20. The engine core 13 is coaxially positioned within an annular bypass duct (not numbered) including an annular radially outer bypass duct wall 10 and an annular radially inner bypass duct wall 11. The radially outer and inner bypass duct walls 10 and 11 define therebetween an annular bypass air passage 30 for directing a bypass air flow 32 drawn by the fan assembly 14. In contrast to the outer bypass duct wall 10 which performs a structural function in supporting and centering the engine core 13, the inner bypass duct wall 11 is typically not a load transmitting component.

Figure 2:
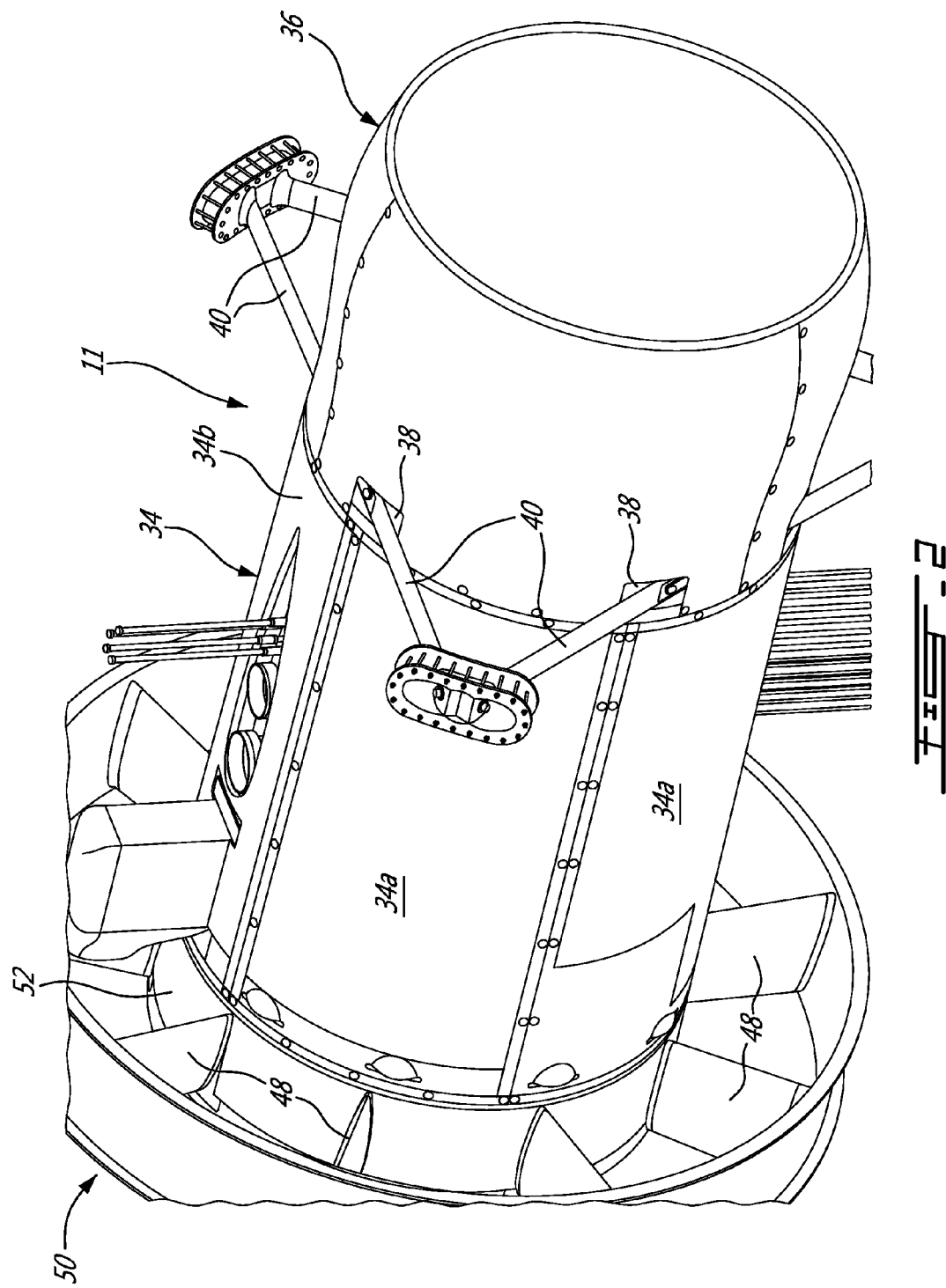
FIG. 2 is a schematic top isometric view illustrating an annular radially inner bypass duct wall including an assembly of front and rear panels which can be used in a gas turbine engine such as the one shown in FIG. 1.

As can be appreciated from FIGS. 2 and 3, the inner bypass duct wall 11 may comprise a circumferential array of front panels 34 and a circumferential array of rear panels 36. By way of example, the circumferential array of front panels 34 may comprise three side panels 34a, a top panel 34b (FIG. 2), and a bottom panel 34c (FIG. 3) assembled together to form a continuous cylindrical wall structure. The front panels 34 may be riveted, bolted or otherwise suitably attached to one another along adjoining circumferential edges. The front panels 34 may comprise an acoustic treatment. As can be appreciated from FIG. 4b, the front panels 34 may comprises layers of acoustic materials with sheet metal skins. The circumferential array of rear panels 36 may comprise three arcuate panels. However, it is understood that a different number of rear panels 36 could be provided. The rear panels may be provided in the form of sheet metal. Like the front panels 34, the rear panels 36 may be riveted, bolted or otherwise suitably joined along circumferentially adjacent edges. Openings or passages may be defined in the front and rear panels 34 and 36 for allowing mounting of equipment to the engine core or to provide access thereto (see for instance the elongated openings defined in the top and bottom front panels 34b and 34c in FIGS. 2 and 3, respectively). Openings may also be defined in the panels 34 and 36 for allowing the passage of structural elements. For instance, holes 38 may be defined in the forward end portion of the rear panels 36 for allowing the passage of links 40 use to mount the outer bypass duct wall 10 to the casing structure of the engine core 13 (e.g. the MTF 28 or the engine exhaust casing).

Now referring more particularly to FIGS. 1, 4 and 5, one possible mounting arrangement of the inner bypass duct wall 11 to the engine core 13 will be described.

As shown in FIG. 1, the mounting arrangement may comprise a front mounting assembly 42 and a rear mounting assembly 44. As will be seen hereinafter, the front mounting assembly 42 and the rear mounting assembly 44 are configured to allow the modular engine core case, including the high turbine case, the mid-turbine frame 28, and the low pressure turbine case, to radially and axially thermally expand and contract relative to the inner bypass duct wall 11. Indeed, the radially outer bypass duct wall 11 is cooled down by the bypass air stream flowing through the bypass duct passage 30 during engine operation and is, thus, not subject to the same thermal stresses as the engine core case structure. The front and rear mounting assemblies 42 and 44 are configured to accommodate the thermal fight between the inner bypass duct wall 11 and the engine core cases. This may be accomplished by using a rigid connection in cold front areas of the engine and a flexible connection in the comparatively hotter rear areas of the engine.

As depicted by line 46, the front mounting assembly 42 may be located in a plane immediately downstream of an inlet (not numbered) of the annular bypass air passage 30. According to the illustrated embodiment, the front mounting plane 46 is disposed just downstream of a circumferential array of radial struts 48 of an intermediate case 50 (FIGS. 2, 3, 4a and 4b) of the engine core 13. The rear mounting assembly 44 may be provided at a rear axial position indicated by line 52 (representing a rear mounting plane), upstream of an outlet (not numbered) of the bypass air passage 30. According to the illustrated embodiment, the rear mounting assembly 44 is generally axially aligned with the MTF 28 of the engine core 13. The first mounting assembly 42 is provided in a relatively cold area of the engine where there is substantially no thermal gradient between the inner bypass duct wall 11 and the adjacent core case structure (i.e. the intermediate case 50).

Figure 4B:
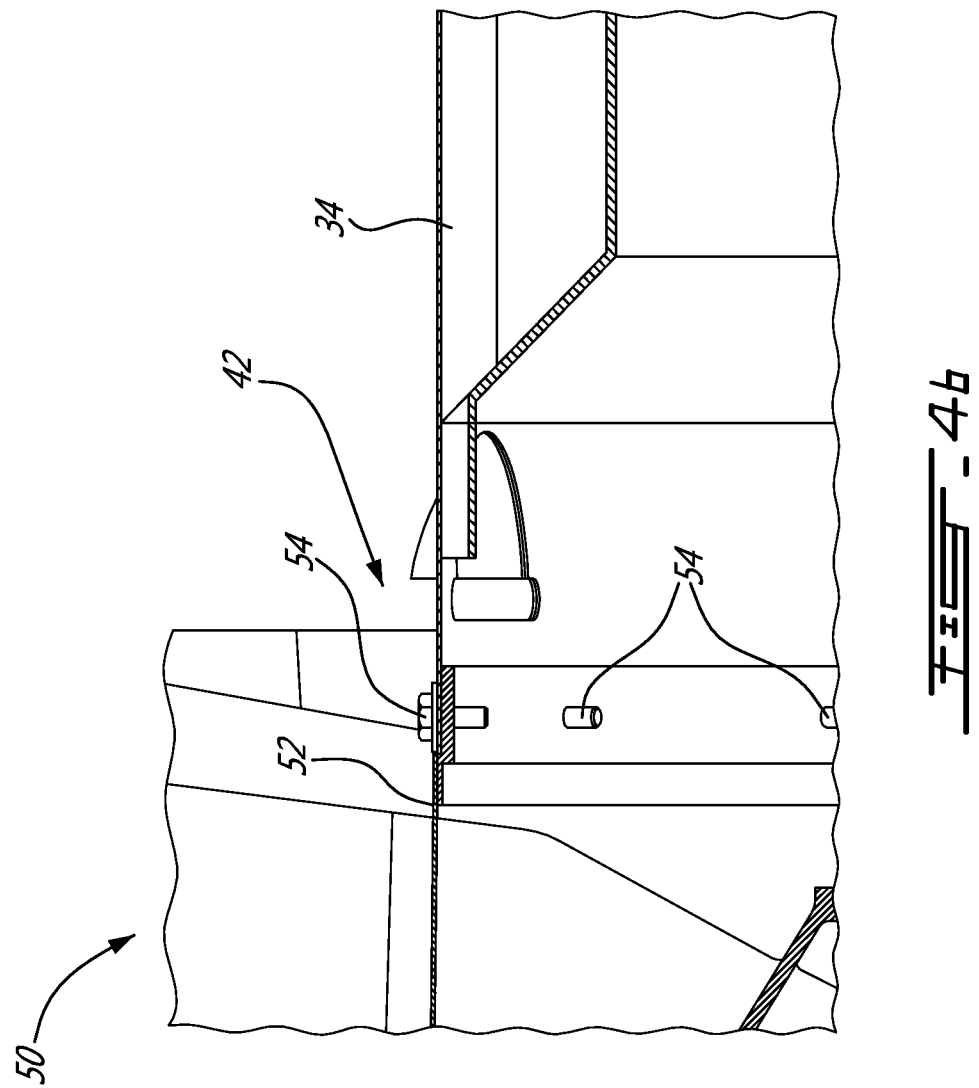
FIG. 4b is an enlarged cross-section view of the front mounting assembly illustrating how the front panels may be bolted to an intermediate case of the engine core case structure.

FIGS. 4a and 4b illustrate one possible embodiment of the front mounting assembly 42. More particularly, the front panels 34 of the inner bypass duct wall 11 may be rigidly connected to the intermediate case 50 of the engine core 13. According to the illustrated embodiment, the front panels 34 are bolted at a front end thereof to a rear edge portion of a radially inner ring 52 of the intermediate case 50. A circumferential array of bolts 54 may be used to provide a rigid bolted connection between the radially inner bypass duct wall 11 and the intermediate case 50. The rigid connection between the panels 34 and the intermediate case 50 will keep the panels 34 fixed in all directions at that axial location of the engine.

Figure 5A:
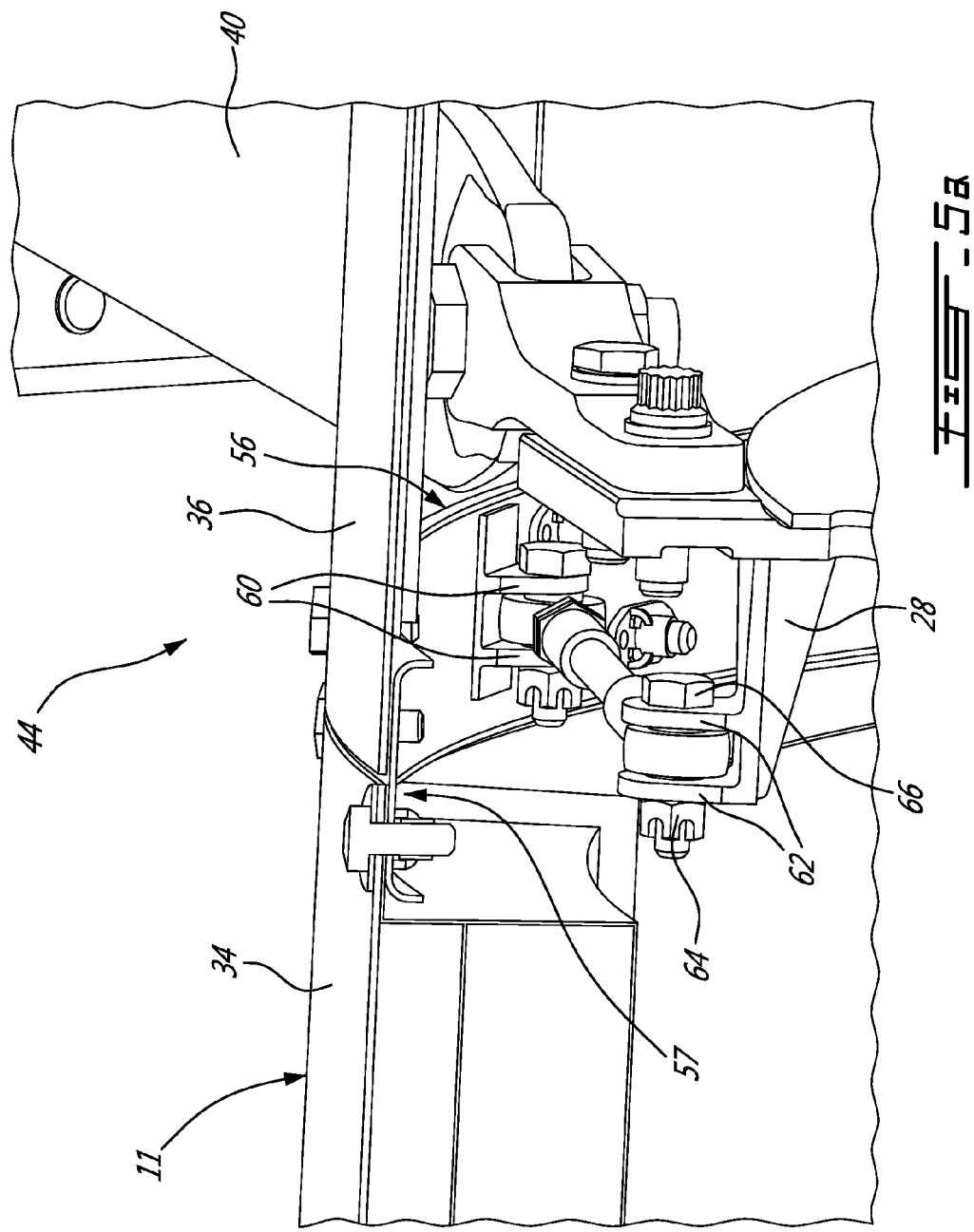
FIG. 5a is an enlarged isometric view of a rear mounting assembly of the radially inner bypass duct wall, showing a bracket joint between the front and rear panels connected to the engine core case structure with a plurality of circumferentially distributed core links.
Figure 5B:
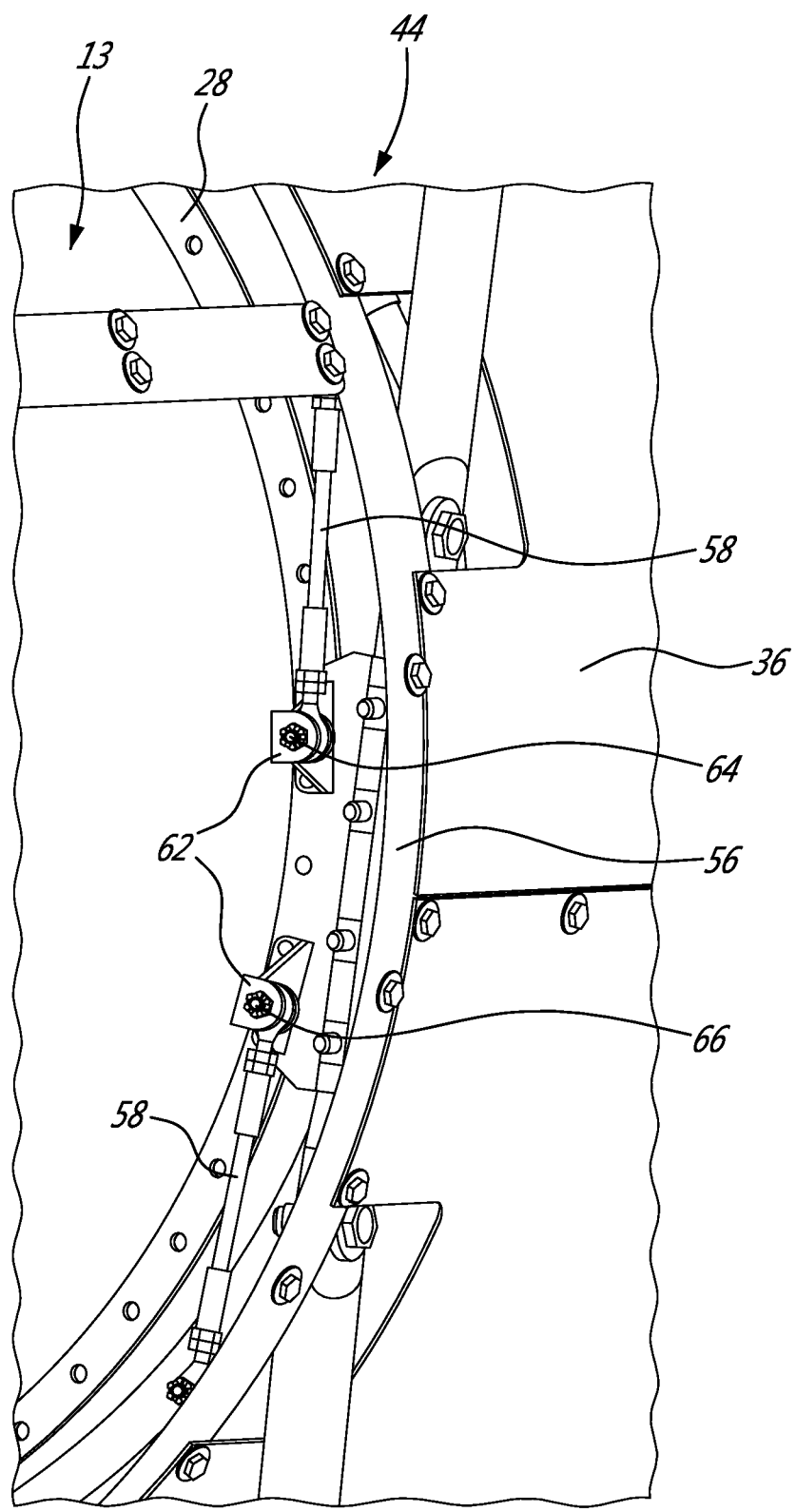
FIG. 5b is an enlarged end view illustrating two of the core links extending between the radially inner bypass duct wall and the engine core case.

FIGS. 5a and 5b illustrate one possible embodiment of the rear mounting assembly 44. The rear mounting assembly 44 is provided in the form of a flexible connection to allow the most thermally solicited core cases (e.g. the MTF 28) to thermally grow relative to the inner bypass duct wall 11. The rear mounting assembly 44 may comprise a mounting ring which may be formed of two semi-circular sheet metal brackets 56 and a set of circumferentially spaced-apart core links 58. As best shown in FIG. 5a, the brackets 56 may be provided at the joint between the front and rear panels 34 and 36 of the inner bypass duct wall 11. The brackets 56 axially overlap the front and rear panels 34 and 36 and extend circumferentially along a radially inwardly facing surface of the panels 34 and 36 to jointly form a full ring structure (a 360 degrees ring structure). Each bracket 56 may have a generally C-shaped cross-section with an arcuate bottom wall 57 for embracing the inner circumference of the inner bypass duct wall 11. The front and rear panels 34 and 36 may be bolted or otherwise suitably rigidly attached to the bottom wall 57 of the brackets 56. Accordingly, the brackets 56 hold the front and rear panels 34 and 36 together in an axially end-to-end relationship. The brackets 56 are attached to the MTF 28 by the core links 58. According to one embodiment, 6 links 58 are used to attach the brackets 56 and, thus, the inner bypass duct wall 11, to the MTF 28. The radially outer end of each link 58 is received between a pair of axially spaced-apart mounting flanges 60 projecting radially inwardly from the bottom wall 57 of the brackets 56. Likewise, the radially inner end of the links 58 are received between a pair of axially spaced-apart mounting flanges 62 projecting from the MTF 28. The mounting flanges 60 and 62 are circumferentially distributed. The radially inner and radially outer ends of the links 58 may be each provided with a spherical bearing or other suitable articulation structure allowing for axial and radial movement (i.e. angular movement in two orthogonal directions) of the MTF 28 relative to the inner bypass wall 11. The ends of the links 58 may be attached to the mounting flanges 60 and 62 by means of locking nuts 64 threadably engaged on pins 66 extending axially through the mounting flanges 60 and 62 and the spherical bearings at the ends of the links 58. Other suitable fastening structures are contemplated as well.

The link system maintains the inner bypass duct wall 11 concentric with the core cases yet allow for core thermal growth without imposing additional loads on the panels 34 and 36 of the inner bypass duct wall 11. In other words, it allows the "hot" engine core cases to growth thermally independently of the "cool" inner bypass duct wall while maintaining the axial position and concentricity of the inner bypass duct wall with respect to the engine core cases. This may contribute to reduce maintenance and warranty costs resulting from inner bypass duct wall cracks and thermal distress.

The front and rear mounting arrangements 42 and 44 may also contribute to reduce the weight of the engine through the elimination of multiple steel brackets typically used to attach the inner bypass duct wall 11 to the engine. It also improves maintenance ergonomics by the elimination of the conventional sheet metal brackets as a protruding hazard. It also contributes to reduce the engine assembly time by requiring fewer fasteners for attaching the inner bypass duct wall to the engine core cases.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A turbofan engine comprising: an engine core mounted about an axis, the engine core having a core case surrounded by a bypass duct including a radially outer bypass duct wall and a radially inner bypass duct wall defining therebetween an annular bypass passage, a rigid connection between a front end portion of the radially inner bypass duct wall and a corresponding front end portion of the core case, and a flexible connection between a rear end portion of the radially inner bypass duct and a corresponding rear end portion of the core case, the flexible connection allowing the rear end portion of the core case to thermally grow and contract relative to the radially inner bypass duct wall.

2. The turbofan engine defined in claim 1, wherein the core comprises an intermediate case disposed axially forwardly of the radially inner bypass duct, and a mid turbine frame (MTF) disposed axially between high and low pressure turbine sections of the engine core, the rigid connection being provided between the intermediate case and the radially inner bypass duct wall, the flexible connection being provided between the MTF and the radially inner bypass duct wall.

3. The turbofan engine defined in claim 1, wherein the rigid connection comprises a bolted connection between the radially inner bypass duct wall and a radially inner ring of an intermediate case forming part of the core case, the intermediate case being disposed axially forwardly of a high pressure compressor section of the engine core.

4. The turbofan engine defined in claim 1, wherein the flexible connection comprises a set of circumferentially distributed links, the links extending radially inwardly from the radially inner bypass duct wall to the core case, each of the links having radially inner and radially outer ends, the radially inner and outer ends being circumferentially spaced-apart around a circumference of the core case.

5. The turbofan engine defined in claim 4, wherein each of the links is provided at each opposed end thereof with an articulation allowing angular movement about a central point in two orthogonal directions.

6. The turbofan engine defined in claim 5, wherein the articulation is a spherical bearing.

7. The turbofan engine defined in claim 1, wherein the radially inner bypass wall has separate front and rear portions, the rear portion extending axially rearwardly from the front portion, wherein the flexible connection comprises at least one bracket axially overlapping a joint of the front and rear portions of the radially inner bypass duct wall, the at least one bracket being mounted to a radially inner surface of the front and rear portions and holding them together, and a set of circumferentially spaced-apart articulated links connecting the at least one bracket to the core case.

8. The turbofan engine defined in claim 7, wherein the front portion comprises a set of circumferentially adjoining front panels, the rear portion including a set of circumferentially adjoining rear panels, and wherein the front and rear panels are bolted to the at least one bracket.

9. The turbofan engine defined in claim 7, wherein the at least one bracket comprises two semi-circular brackets forming a substantially full ring on the radially inner surface of the radially inner bypass duct wall.

10. A bypass duct mounting arrangement for a gas turbine engine having an engine core with a core case, the mounting arrangement comprising: an outer bypass duct wall structurally connected to the core case, and an inner bypass duct wall disposed radially inwardly of the outer bypass duct wall, the inner and outer bypass duct walls defining therebetween an annular bypass passage about the engine core, the inner bypass duct wall having a front end portion which is rigidly mounted to the core case and a rear end portion which is flexibly mounted to the core case, the flexible mounting between the rear portion of the inner bypass duct wall and the core case allowing hot engine areas of the core case to thermally grow and contract relative to the inner bypass duct wall.

11. The bypass duct wall assembly defined in claim 10, wherein a set of circumferentially spaced-apart links are provided between the rear portion of the inner bypass duct wall and the core case, the links being articulated to both the inner bypass duct wall and the core case to permit axial and radial movements therebetween.

12. The bypass duct wall assembly 11, wherein the front and rear portions of the inner bypass duct wall respectively comprise front and rear circumferentially adjoining panels, and wherein at least one bracket is provided on a radially inner side of the front and rear panels to hold them together in a end-to-end relationship, and wherein the links extend from said at least one bracket.

13. The bypass duct wall assembly defined in claim 12, wherein the front and rear panels are bolted to the at least one bracket.

14. The bypass duct wall assembly defined in claim 10, wherein the links are provided with spherical bearings at opposed ends thereof.

15. The bypass duct wall assembly defined in claim 10, wherein the front end portion of the inner bypass duct wall is bolted to the core case.

16. A method of attaching an inner bypass duct wall to a core case assembly of a gas turbine engine, the core case assembly comprising an intermediate case disposed forwardly of the inner bypass duct wall and a mid turbine frame (MTF) disposed axially between a high pressure and a low pressure turbine case section of the engine, the method comprising: rigidly attaching a front end portion of the inner bypass duct wall to the intermediate case, and flexibly attaching a rear portion of the inner bypass duct wall to the MTF.

17. The method defined in claim 16, wherein flexibly attaching comprises articulately connecting the rear portion of the inner bypass duct wall to the MTF with a set of circumferentially spaced-apart links, the links being articulated to allow the MTF to thermally expand and contract in radial and axial directions relative to the inner bypass duct wall.

18. The method defined in claim 17, wherein rigidly attaching comprises bolting the front end portion of the inner bypass duct wall to the intermediate case.

\* \* \* \* \*